(12) United States Patent
Davis

(10) Patent No.: US 11,686,352 B2
(45) Date of Patent: Jun. 27, 2023

(54) CLUTCH ASSEMBLY

(71) Applicant: Clutch Industries Pty Ltd, Coburg North (AU)

(72) Inventor: Brad Davis, Coburg North (AU)

(73) Assignee: Clutch Industries Pty Ltd, Coburg North (AU)

(*) Notice: Subject to any disclaimer, the term of this patent is extended or adjusted under 35 U.S.C. 154(b) by 0 days.

(21) Appl. No.: 17/383,791

(22) Filed: Jul. 23, 2021

(65) Prior Publication Data

US 2022/0025934 A1    Jan. 27, 2022

(30) Foreign Application Priority Data

Jul. 27, 2020  (AU) .................................. 2020902619

(51) Int. Cl.
*F16D 13/58* (2006.01)
*F16F 15/315* (2006.01)

(52) U.S. Cl.
CPC ............ *F16D 13/58* (2013.01); *F16F 15/315* (2013.01); *F16D 2250/0084* (2013.01); *F16D 2300/22* (2013.01)

(58) Field of Classification Search
CPC .......... F16D 13/58; F16D 13/38; F16D 13/68; F16D 13/70; F16D 13/75; F16D 2300/22; F16D 2300/12; F16D 2250/0084; F16F 15/315; F16F 15/30
See application file for complete search history.

(56) References Cited

U.S. PATENT DOCUMENTS

| | | | |
|---|---|---|---|
| 1,577,901 A | 3/1926 | Fawick | |
| 1,665,554 A | 4/1928 | Kolb | |
| 2,181,797 A | 11/1939 | Bateman | |
| 3,129,570 A | 4/1964 | Ludwig | |
| 3,465,860 A | 9/1969 | Gingery | |
| 3,981,138 A | 9/1976 | Nosek | |
| 4,057,131 A * | 11/1977 | Flotow | F16D 13/385 192/112 |
| 4,185,728 A | 1/1980 | Gatewood | |
| 4,352,420 A | 10/1982 | Maycock | |

(Continued)

FOREIGN PATENT DOCUMENTS

| | | |
|---|---|---|
| CN | 105840685 A | 8/2016 |
| CN | 111207156 A | 5/2020 |
| KR | 20050020905 A | 3/2005 |

OTHER PUBLICATIONS

RXT Twin Disc (retrieved from internet on Aug. 18, 2021) <url:https://web.archive.org/web/20120226163945/http://mcleodracing.com/products/RXT+Twin+Disc.mcl > published on Feb. 26, 2012 as per Wayback Machine Related to US 2012/0181134.

(Continued)

*Primary Examiner* — Timothy Hannon
(74) *Attorney, Agent, or Firm* — Womble Bond Dickinson (US) LLP

(57) ABSTRACT

A clutch assembly comprising a sealed clutch and an adapter. The clutch being connected to the adapter and the adapter being connectable to a flywheel. The adapter including openings positioned for registration with the connection pattern of a flywheel for connecting the adapter to the flywheel. The openings of the adapter comprising at least two groups of openings for registration with the connection patterns of at least two different flywheels.

15 Claims, 6 Drawing Sheets

(56) References Cited

U.S. PATENT DOCUMENTS

| | | | |
|---|---|---|---|
| 4,446,955 A | | 5/1984 | Lech, Jr. |
| 4,461,376 A | | 7/1984 | Lech, Jr. et al. |
| 4,692,053 A | | 9/1987 | Sampedro |
| 4,815,189 A | | 3/1989 | Ijames et al. |
| 4,941,557 A | * | 7/1990 | Flotow .................. F16D 13/385 |
| | | | 192/111.4 |
| 5,333,712 A | * | 8/1994 | Sabee ..................... F16D 23/04 |
| | | | 192/48.5 |
| 5,954,552 A | * | 9/1999 | Lauterbach ........... F16D 27/112 |
| | | | 440/38 |
| 6,557,687 B1 | | 5/2003 | Herchick |
| 7,770,704 B1 | | 8/2010 | Dumas |
| 2004/0195067 A1 | | 10/2004 | Friedrich et al. |
| 2005/0121282 A1 | | 6/2005 | Fox |
| 2006/0260900 A1 | | 11/2006 | Bassett |
| 2010/0130289 A1 | | 5/2010 | Uehara et al. |
| 2012/0181134 A1 | | 7/2012 | Roberts et al. |
| 2015/0240881 A1 | | 8/2015 | Bibby |
| 2018/0073569 A1 | | 3/2018 | Crespo et al. |
| 2022/0025934 A1 | | 1/2022 | Davis |
| 2022/0025935 A1 | | 1/2022 | Davis |

OTHER PUBLICATIONS

International Search Report and Written Opinion for PCT/AU2021/050804 dated Aug. 26, 2021.
International Search Report and Written Opinion for PCT/AU2021/050805 dated Sep. 24, 2021.
International Search Report and Written Opinion for PCT/AU2021/050806 dated Aug. 6, 2021.

\* cited by examiner

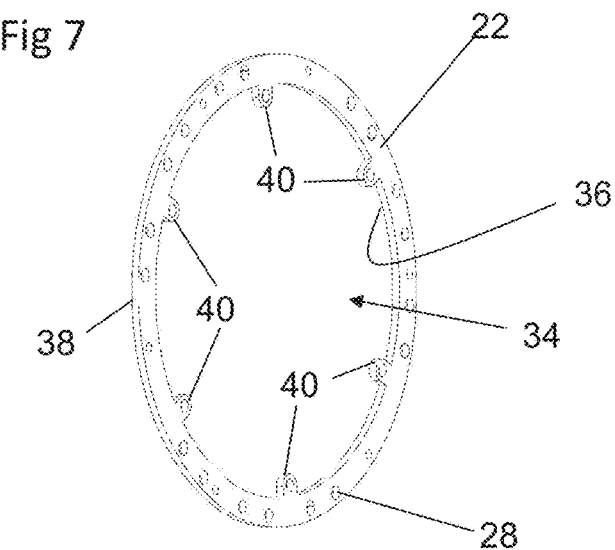
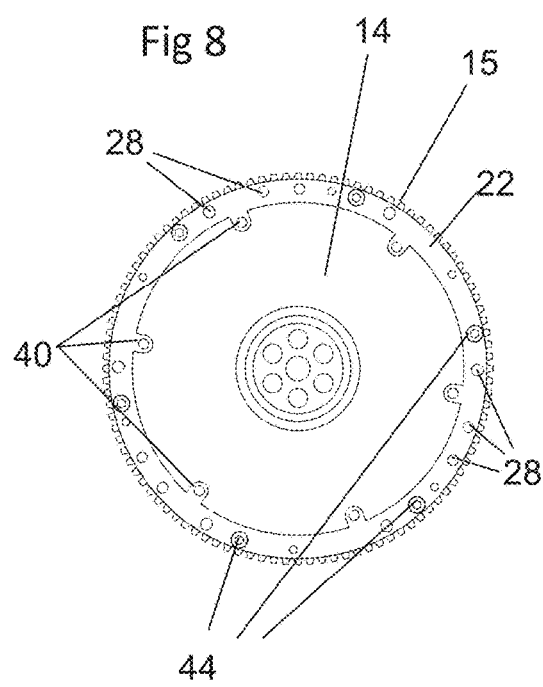
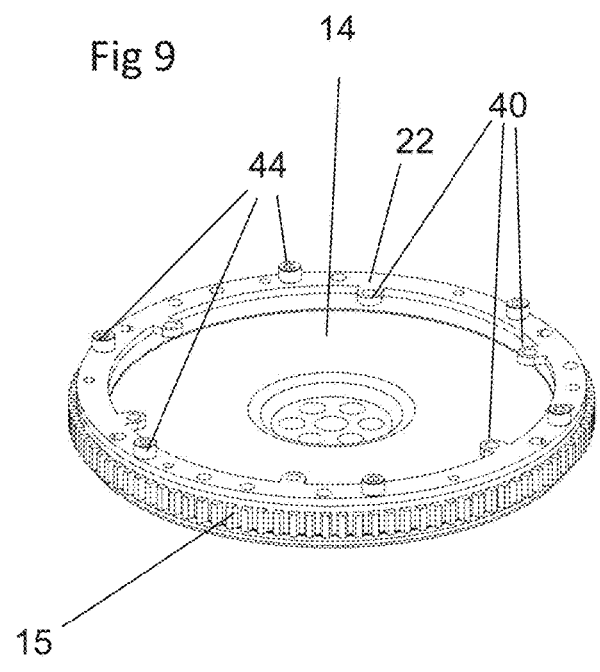

CLUTCH ASSEMBLY

PRIORITY CROSS-REFERENCE

The present application claims priority from Australian Provisional Patent Application No. 2020902619 filed 27 Jul. 2020 the contents of which is to be considered to be incorporated into this specification by this reference.

TECHNICAL FIELD

The present invention relates to a clutch assembly for an automotive vehicle and more particularly to a clutch assembly that can be mounted to multiple different flywheels of a vehicle engine. The clutch assembly can thus be termed as a "universal" clutch assembly in that the clutch assembly of the present invention facilitates attachment of one form of clutch universally to multiple different forms of flywheels.

BACKGROUND OF INVENTION

The discussion of the background to the invention that follows is intended to facilitate an understanding of the invention. However, it should be appreciated that the discussion is not an acknowledgement or admission that any aspect of the discussion was part of the common general knowledge as at the priority date of the application.

Vehicle manufacturers are continuously innovating and optimising vehicle components in order develop new and improved vehicles. Amongst the components that are targeted for optimisation or re-design is the clutch assembly that connects between the vehicle engine and transmission. In particular, when manufacturers release a new vehicle, the clutch system is typically different to the outgoing model. Over the past 70 years, vehicle manufacturers have developed over 5000 different clutch configurations for different vehicles. The applicant itself stocks over 4000 different clutch kits that are used for replacement of worn or damaged clutches.

As vehicle manufacturers seek increases in engine torque output, fuel economy and improvements in noise, vibration, and harshness (NVH), the clutch assembly is often modified or re-designed. Clutch assemblies are gradually becoming more complex to be able meet vehicle performance standards. It is expected that the increased complexity in clutch assemblies will see the cost of the average clutch system increase approximately 45% from USD$171 as at 2018 to approximately USD$250 by 2025.

Existing clutch kits (kits of parts that form a clutch assembly, including friction disc, pressure plate, diaphragm etc.) are not considered to be particularly versatile and can only be applied to a very limited number of vehicles. Of the currently available clutch kits, approximately only 260 kits can fit onto more than 10 different vehicles. The lack of cross-vehicle compatibility of clutch kits provides a burden on inventory management for manufacturers and suppliers. Typical installers do not have the capacity (either in terms of space or money) to carry the enormous inventory required to be able to replaces clutches across a wide range of vehicles. Manufacturers, suppliers and installers are therefore heavily reliant on expedited freight systems to be able to promptly provide customers (the installers) with replacement kits for specific vehicles when the clutch of that vehicle requires replacement.

Repair rather than full replacement of a clutch is rarely an option given that, due to the large cost and inconvenience associated with attending an automotive workshop to deal with clutch issues, vehicle owners usually run the clutch assembly to failure before having a mechanic replace it. But this results in a significant repair activity, involving raising the vehicle on a hoist, removing various parts of the vehicle drivetrain including the clutch, ordering and thereafter installing a new clutch and replacing the remaining drivetrain parts. Moreover, it is usually necessary for the vehicle to be assessed first, to establish that the existing clutch does need to be replaced and so before a clutch kit is ordered, the vehicle usually needs to be raised on a hoist and if the decision is to replace the clutch often the vehicle will be left on the hoist while the new clutch is ordered and delivered. The vehicle thus tends to occupy valuable space and equipment in the automotive workshop (automotive workshops tend to have limited numbers of hoists) over at least two days (but often more where delivery of the new clutch is delayed or where delivery is to rural or remote locations), while the vehicle owner is inconvenienced by having the vehicle off the road for an extended period of time, often having to rent a replacement vehicle until their own vehicle is repaired. Because of this, manufacturers and suppliers have established elaborate and expensive inventory and logistic networks to expedite the delivery of clutch kit orders. The establishment of these inventory and logistic networks require significant capital expenditure in addition to ongoing running costs.

As there exists a large number of clutch kits, it is common for an installer to mistakenly order a clutch kit that is incompatible with the particular vehicle being repaired, or with the particular vehicle model. This contributes to additional supply chain expenses to the supplier, the mechanic and the customer given that the wrongly ordered clutch kit must be returned and the correct clutch kit delivered. Moreover, given the vast number of clutches currently in use, it is often the case that mechanics and suppliers encounter delays and difficulty in sourcing the correct clutch kit.

Further, as each clutch kit is to be fitted to a certain alignment and configuration, installers are required to diligently review installation specifications, and manufacturers are required to provide installers and suppliers with support through training sessions and instruction manuals. Where an installer is unable to align a clutch to the specified configuration, the life of the new clutch can be significantly compromised, and may potentially cause damage to surrounding vehicle components, i.e. the engine on one side of the clutch and the transmission on the other side.

As part of the replacement of a clutch, the flywheel attached to the crankshaft of the engine will also be assessed for wear or damage. This occurs because traditional clutches frictionally engage a surface of the flywheel for torque transmission. That flywheel surface almost always needs to be refurbished by re-grinding and so this adds to further time and expense in removing the flywheel and in sending it for grinding.

The useful life of a standard clutch is approximately 100,000 kilometres. As the average life of a vehicle is 250,000 kilometres, at least two clutch replacements are inevitable. As explained above, the process to change a clutch is labour intensive and time-consuming and can take approximately two to four days to complete. Throughout this time the vehicle owner will be without their vehicle and the automotive workshop will have the vehicle occupying garage space and resources while dormant.

For at least the forgoing reasons, the applicant has proceeded to develop new clutch assemblies with the intention to mitigate or eliminate some or all of the onerous aspects of a conventional vehicle clutch replacement. In particular, the applicant considers there to be a need for a new form of clutch assembly which can be fitted to more than one type of vehicle so that a specific form or type of clutch assembly is not required for each different vehicle or each small group of vehicles.

SUMMARY OF INVENTION

According to the present invention there is provided a clutch assembly comprising a sealed clutch and an adapter, the clutch being connected to the adapter and the adapter being connectable to a flywheel, the adapter including openings positioned for registration with the connection pattern of a flywheel for connecting the adapter to the flywheel, the openings of the adapter comprising at least two groups of openings for registration with the connection patterns of at least two different flywheels.

A sealed clutch as referred to above and throughout this specification is a clutch which does not frictionally engage the face of a flywheel. In some forms, the clutch has a base plate and a pressure plate and an intermediate plate between them and the friction linings of a clutch plate are positioned on either side of the intermediate plate. In other forms, the clutch could have just a single friction lining between a base plate and a pressure plate and no intermediate plate, or it could have more than two plates, such as three of four plates (known as triple or quad clutches). The clutch plates drive a transmission shaft and the pressure plate is axially movable within the clutch to frictionally engage and disengage the clutch plates. Sealed clutches can also be modular clutches and in certain regions are also known as 'pre-assembled' clutches. In addition, clutch plates are also known as clutch discs and so the use of "plate" and "disc" in this specification is interchangeable and should be considered to be referring to the same item of a clutch.

Many of the benefits provided by the present invention occur because the traditional clutch assemblies are sized and configured to fit a particular vehicle flywheel and to fit within a particular area or envelope between the flywheel and the transmission. Accordingly, existing clutch assemblies have different flywheel mounting holes and depth or height dimensions, in order that the clutch be mounted correctly to the flywheel and extend the appropriate distance for connection to the transmission. Uniquely, a sealed clutch is not required to engage the flywheel for torque transmission and by the use of an adapter with at least two groups of openings, the clutch assembly can connect to at least two different flywheels and this advantageously means that one form of clutch can be employed in a variety of different vehicles with different flywheels.

It follows that, because the adapter can connect to at least two different flywheels, this enables the sealed clutch (hereinafter referred to as a clutch) of the clutch assembly of the invention to not only employ one form of clutch across a plurality of vehicles with different flywheels, but also to install in a vehicle an improved type, or at least a different type of clutch that is not otherwise installable in a particular vehicle. For example, a single disc clutch that is supplied as original equipment with a vehicle, might be replaced by a twin disc or triple disc sealed clutch for improved performance or longevity. Clutches having even greater numbers of discs can be employed, five, six, seven or more. The benefit here is that the vehicle owner has more choice than previously, because previously, the vehicle owner was limited to the particular clutch that fitted the vehicle. By use of the present invention, the vehicle owner can not only choose to replace the previous clutch with a clutch having generally the same performance and longevity, but the vehicle owner can alternatively select a different clutch for the replacement, which might be cheaper, of higher performance, or of greater longevity. The vehicle owner now has a choice that might not have been available in the past.

An adapter that is used in clutch assembly according to the present invention can have more than two groups of openings. Thus, the adapter can have three, four, five, six or more groups of openings, so that the openings of the adapter are registrable with the connection pattern of three or more different flywheels, whereby the connection pattern of a flywheel is the pattern of openings provided to connect with a clutch. This increases the number of flywheels that an adapter according to the invention can facilitate connection of a clutch to, further reducing the inventory that installers are required to carry to be in a position to replace clutches across a wide range of vehicles, or further reducing the need for ordering clutches and component parts that are unique to the vehicle under repair.

The adapter of the invention can include openings spaced apart in any suitable pattern. The openings would usually be bolt or stud openings and likewise the connection pattern of the flywheel would usually be formed by bolt or stud openings. In forming the adapter, the position of the openings will be based on an analysis of the position of connection patterns of various flywheels and an analysis of the availability of space within the adapter to accommodate a plurality of openings to suit a plurality of flywheels. Given the extensive range of different flywheels, it is likely that openings can be provided in adapters to suit at least four or five different flywheels, but some of the analysis will involve limiting the flywheels to those that are regularly the subject of clutch replacement. Flywheels that are used in low volume vehicles, high performance vehicles for example, are unlikely to suitable for accommodation in an adapter according to the invention.

As indicated above, an adapter of a clutch assembly according to the invention can included openings to facilitate connection of the adapter to two or more forms of flywheel, preferably three, four, five, six or more forms of flywheel. In addition, a clutch assembly according to the invention can be provided with multiple adapters so that the number of different flywheels that can be accommodated by a clutch assembly according to the invention is expanded greatly. Only one adapter of the multiple adapters will be used in a clutch/flywheel repair/replacement, and the adapters that are not used can be retained for later use for different vehicles. Each adapter can have two or more groups of openings, although it is not a requirement that each adapter have the same number of groups of openings. Accordingly, one of the multiple adapters can have two groups of openings and another of the multiple adapters can have four groups of openings for example.

It is to be appreciated also that each group of openings can have different numbers of openings to suit the connection pattern of the particular flywheel that the group of openings is intended to register with.

In the above arrangement, it is intended that each different adapter will connect to multiple flywheels, but each flywheel will connect to only one adapter. It would be acceptable if there were flywheels that connected to more than one adapter, but the intention for maximum flywheel coverage is not to have multiple flywheels connectable to multiple adapters. The present applicant has established that the supply of twelve different adapters which can each connect to multiple different flywheels will enable a clutch assembly according to the invention to connect/bolt to the flywheels of over 90% of currently available manual vehicles. As will readily be appreciated, an installer can thus stock a small range of sealed clutches and a supply of adapters and be in a position to replace the great majority of clutches without needing to order and await arrival of replacement parts. In this arrangement, it will be relatively easy by computer or manual for the installer to indicate the make and model of vehicle and for the correct adapter to then be identified for use.

The above stated advantage means that a reduced number of clutch kits need to be manufactured, stored and delivered. This will have an advantageous effect in reducing costs for manufacturing (less different component parts will be needed), storage space, delivery and will reduce the amount of errors made during selection and ordering of clutch kits. Moreover, it is more likely that automotive workshops will be able to carry stock that will allow them to have suitable clutch parts on hand whereby an order and subsequent delivery of parts is not required. This would facilitate better scheduling of clutch repairs so that replacement of a clutch could take place on the day the vehicle is provided to the automotive workshop, with all the associated benefits to both the customer and the workshop.

The adapter used in the invention can have any suitable configuration. It is anticipated that in many forms of the invention, the adapter will be a plate having a generally constant wall thickness and the adapter can be formed as a circular ring. The ring can have a constant wall thickness and circular inner and outer edges with the dimension between the inner and outer edges being constant.

Alternatively, the adapter could be formed as a non-circular ring, such as a hexagon for example.

The axial thickness of the adapter is preferably similar to or the same as that of the section of the original clutch that is being replaced and through which bolts or other connectors extend to connect the original clutch to the flywheel. This then allows the original bolts or connectors that were used with the original clutch to be re-used to attach the adapter to the flywheel. The bolts or connectors would normally extend through a plate section at the periphery of the original clutch so formation of the adapter as a plate of similar or the same plate thickness is preferred.

The adapter can be made of any suitable material, such as of steel.

Where multiple adapters are provided, these can differ in any suitable manner from each other to provide the breadth in connectivity to different flywheels as required. The flywheels could differ for example in shape, so that one or more are formed in a ring shape while others have different shapes.

Alternatively, where the adapters are formed as rings, the difference between rings can reside in the diameter of the inner edge, the diameter of the outer edge, the dimension between the inner and outer edges and the thickness of the rings. Because the clutch assembly of the invention employs a sealed clutch and because only a very small number of different sealed clutches are intended to be used in the clutch assembly, i.e. a twin disc clutch or triple or quad disc clutches, it is expected that the diameter of the inner edge of the different adapter rings may remain constant as the configuration of the clutches relevant to where they connect to the adapter rings will not change. Rather, generally only the axial depth of a clutch will change to accommodate the greater number of coaxially stacked or spaced discs.

A clutch assembly according to the present invention can also include a spacer that is positioned between the clutch and the adapter. Applicant has developed a clutch assembly that employs a unique form of spacer and has filed a co-pending patent application simultaneously with the present application as Australian Provisional patent application 2020902618. The content of the specification filed with that co-pending patent application is to be considered to be incorporated into this specification by this reference. The adapter of this patent application would replace the connector of the co-pending patent application.

A clutch assembly according to the present invention can thus include a spacer that is connected to the clutch and the adapter is interposed between the spacer and the flywheel for connecting the spacer to the flywheel. The spacer is used where the original vehicle clutch is replaced by a sealed clutch of different dimensions so that in absence of the spacer, the sealed clutch would not connect between the flywheel and the transmission due to dimensional changes. The spacer thus spaces the clutch towards the transmission to connect with the transmission. In the co-pending Australian Provisional patent application 2020902618, the spacer uniquely provides for spacing variation between the flywheel and the clutch (i.e. variation in the distance or spacing between the flywheel and the clutch), by providing at least two mounting positions for the clutch relative to the flywheel. This enables the sealed clutch to be "raised" or "lowered" to the height of the original clutch that is being replaced. Like the present invention, this advantageously enables the invention of the co-pending Australian Provisional patent application 2020902618 to employ one form of clutch across a plurality of vehicles.

In some forms of the invention, the spacer is formed as a ring having opposite axial facing leading and trailing surfaces, and the adapter is formed as a ring that is connectable to either of the leading or trailing surfaces of the spacer. The adapter can include connection tabs for connection to the spacer. The connection tabs can extend radially inwardly from an inner edge of the inner opening of the adapter and the spacer can include connection recesses in the leading and/or trailing surfaces for receipt of the connection tabs. The connection tabs can be bolted to the spacer, such as to the connection recesses of the spacer.

In some forms of the invention, the spacer has an outside generally cylindrical surface and the adapter has a circular inner opening of slightly greater diameter than the outer surface of the spacer and the spacer is received within the opening when the adapter is connected to the spacer.

The spacer can alternatively comprise a plurality of separate spacer elements that connect between the clutch and the adapter or between the adapter and the flywheel, the plurality of separate spacer elements can comprise first spacer elements having a first spacing dimension and second spacer elements having a second spacing dimension, whereby the first or second spacer elements are separately selected based on the spacing dimension required between the clutch and the flywheel to facilitate connection of the clutch to the flywheel in at least two different axially spaced positions.

A clutch assembly according to the invention can form part of a mounting system for mounting a clutch to a flywheel, in which the mounting system comprises:

a sealed clutch, and at least two adapters, wherein each adapter includes openings positioned for registration with the connection pattern of a flywheel for connecting the adapter to the flywheel, the openings of each adapter comprising at least two groups of openings for registration with the connection patterns of at least two different flywheels, and each group of openings of each of the at least two adapters being positioned for registration with the connection pattern of a different flywheel, whereby, the mounting system comprises connecting the clutch to an adapter of the at least two adapters, the adapter being selected based on the connection pattern of the flywheel to which the clutch is to be connected.

A mounting system of the above kind provides multiple (at least two) adapters for selection by the installer depending on the flywheel to which the clutch needs to be connected. The adapters can be of the kind discussed above in relation to the clutch assembly and the mounting system can include a spacer of the kind described above also. The mounting system can include any number of adapters and as indicated above, the inclusion of twelve different adapters which can each connect to multiple different flywheels can enable a clutch assembly according to the invention to connect/bolt to the flywheels of over 90% of currently available manual vehicles.

The present invention also provides a method of installing a clutch assembly of the above described kind, comprising a sealed clutch and an adapter, to a flywheel, method including connecting the adapter to the clutch and orienting the adapter so that one of the at least two groups of openings is in register with the connection pattern of the flywheel, and connecting the selected adapter to the flywheel.

The present invention also provides a method of installing a clutch assembly of the above described kind, comprising a sealed clutch and at least two adapters, the method including selecting an adapter from the at least two adapters, the selected adapter having openings suitable for registration with the connection pattern of a flywheel to which the clutch of the clutch assembly is to be connected, connecting the selected adapter to the clutch and connecting the selected adapter to the flywheel.

In each of the above methods, a spacer can be employed so that the methods would involve connection of the clutch to the spacer and connection of the spacer to the adapter or the selected adapter.

A clutch assembly according to the invention can also be provided as a kit in which the kit includes a sealed clutch, at least two adapters and optionally a spacer, all being of any of the kinds described above.

In all of the above forms of the invention, the adapter or adapters allow a clutch to be connected to more than one flywheel. Clearly the benefits of the invention rise as the number of groups of openings in each adapter increases and the number of adapters provided for use in the invention increases.

BRIEF DESCRIPTION OF DRAWINGS

In order that the invention may be more fully understood, some embodiments will now be described with reference to the figures in which:

FIG. 7 is a perspective view of an adapter plate.

FIG. 8 is a plan view of the adapter ring of FIG. 7 applied to a fly wheel.

FIG. 9 is a perspective view of the FIG. 8 arrangement.

DETAILED DESCRIPTION

Figure 1:
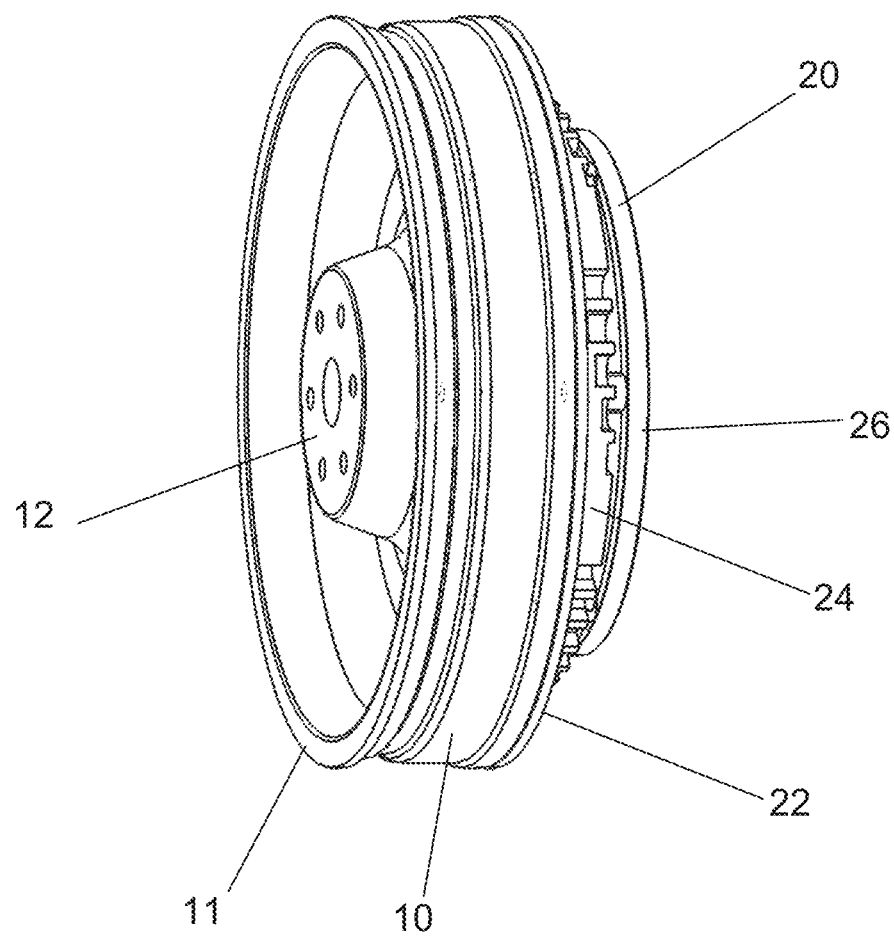
FIG. 1 is a perspective view of a flywheel to which a clutch assembly according to the present invention is connected.

FIG. 1 is a perspective view of a flywheel 10 to which a clutch assembly 20 is connected. The flywheel 10 includes an outer ring 11 within which the majority of the weight of the flywheel 10 is concentrated, while the flywheel 10 further includes a connection hub 12 that in use, connects the flywheel 10 to the crank shaft of an engine. The flywheel 10 is one particular form of flywheel and many other forms exist. However, the basic requirement of a flywheel is to be connectable to a crank shaft and to have significant weight. The weight of a flywheel can be in the order of at least 10 kgs and upwards depending on the size of the vehicle and the power output of the engine.

Figure 2:
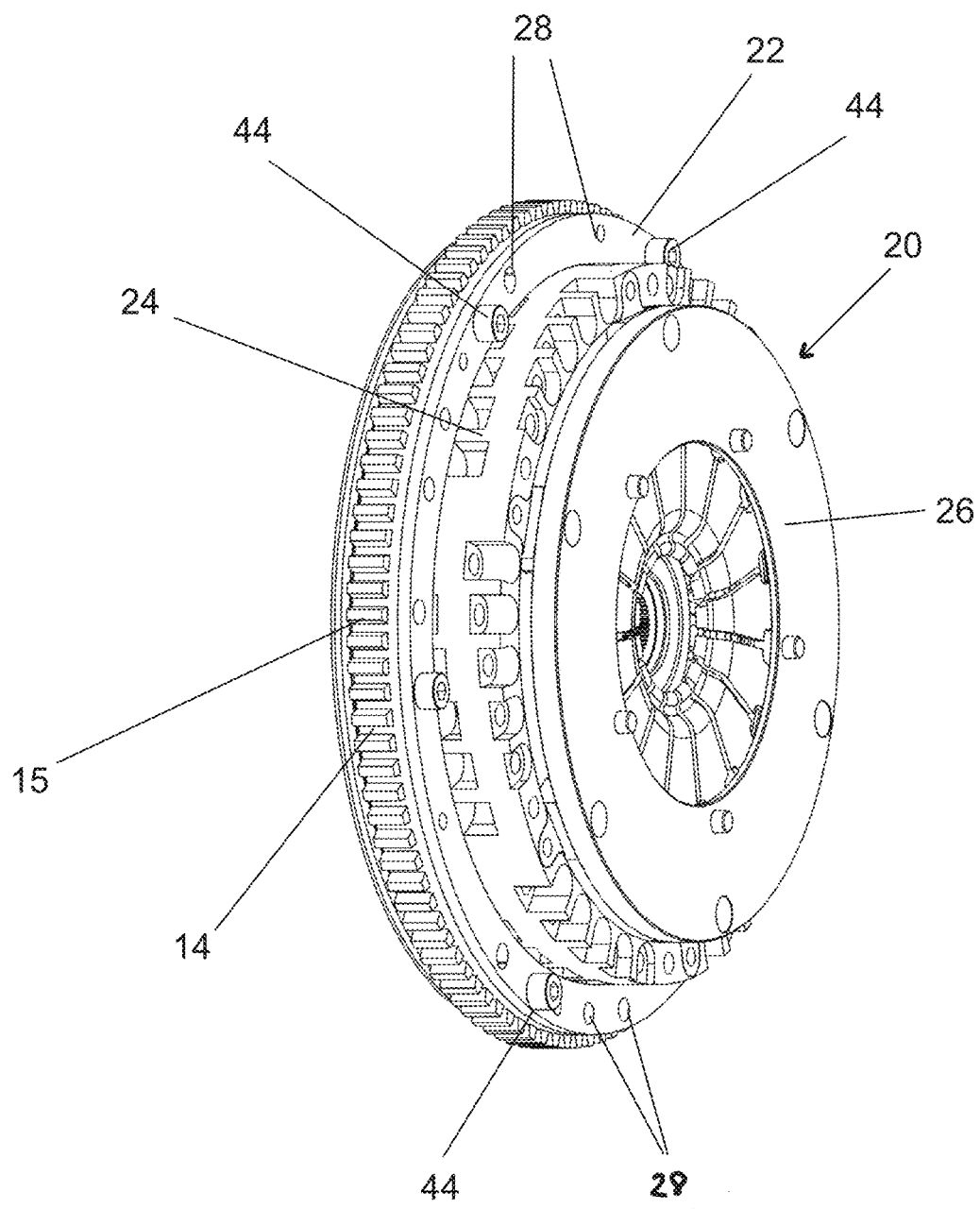
FIG. 2 is a perspective view from a different angle to that of FIG. 1, of a different form of flywheel to which the clutch assembly of FIG. 1 is connected.

FIG. 2 shows an arrangement similar to FIG. 1 but from the opposite perspective and with a different form of flywheel 14 that shows the toothed periphery 15 that in use is engaged by a starter motor. FIG. 2 shows the clutch assembly 20 in more detail and shows that the clutch assembly 20 includes an adapter in the form of an adapter plate 22 in connection with the flywheel 14, a spacer 24 and a clutch 26. The clutch assembly 20 thus varies from existing clutch installations, in which the clutch would connect directly to the flywheel and engage a friction surface of the flywheel. As illustrated, the clutch 26 connects to the flywheel 14 via a combination of the adapter plate 22 and the spacer 24. The spacer 24 shown in the figures of this specification is the same as that shown and described in Applicant's co-pending Australian Provisional patent application 2020902618 referred to above and the discussion in that application in relation to the spacer 24 is incorporated herein by cross-reference.

The clutch 26 of the clutch assembly 20 is a sealed clutch that, as explained earlier herein, is not required to engage the flywheel 14 for torque transmission. This allows the spacing of the clutch 26 to be adjusted axially relative to the flywheel 14 in order to fit within the operating space or envelope that is available for the particular vehicle in which the clutch assembly 20 is being installed. Advantageously, this allows the one clutch assembly 20 to fit into the various different available spaces or envelopes of different vehicles. This has the significant advantages discussed above.

Figure 3:
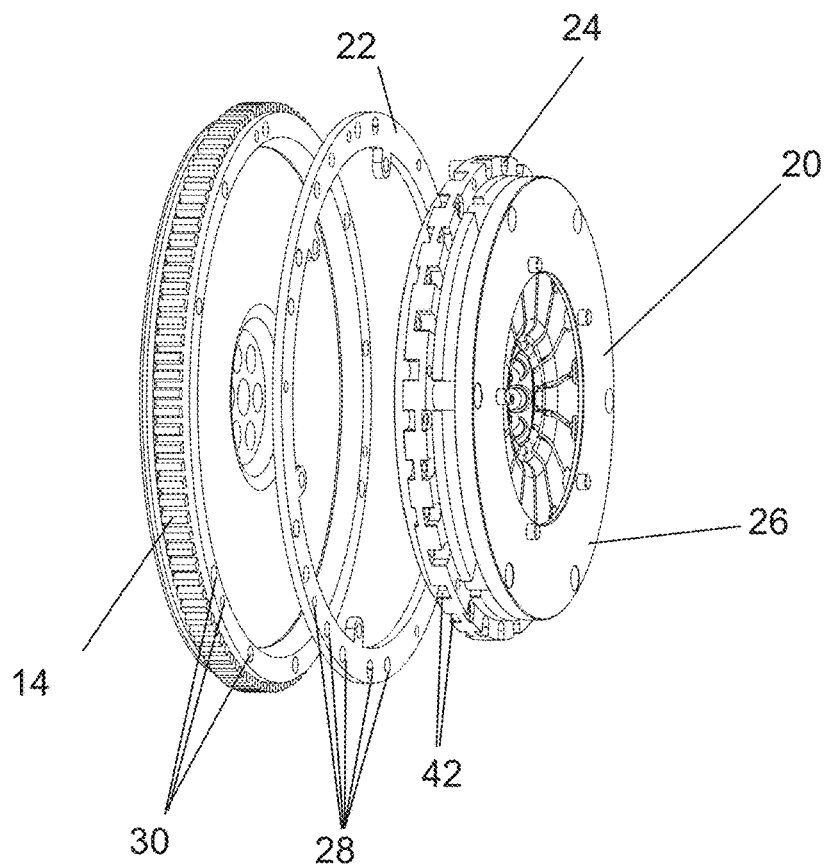
FIG. 3 is an exploded view of the clutch assembly of FIG. 2.
Figure 5:
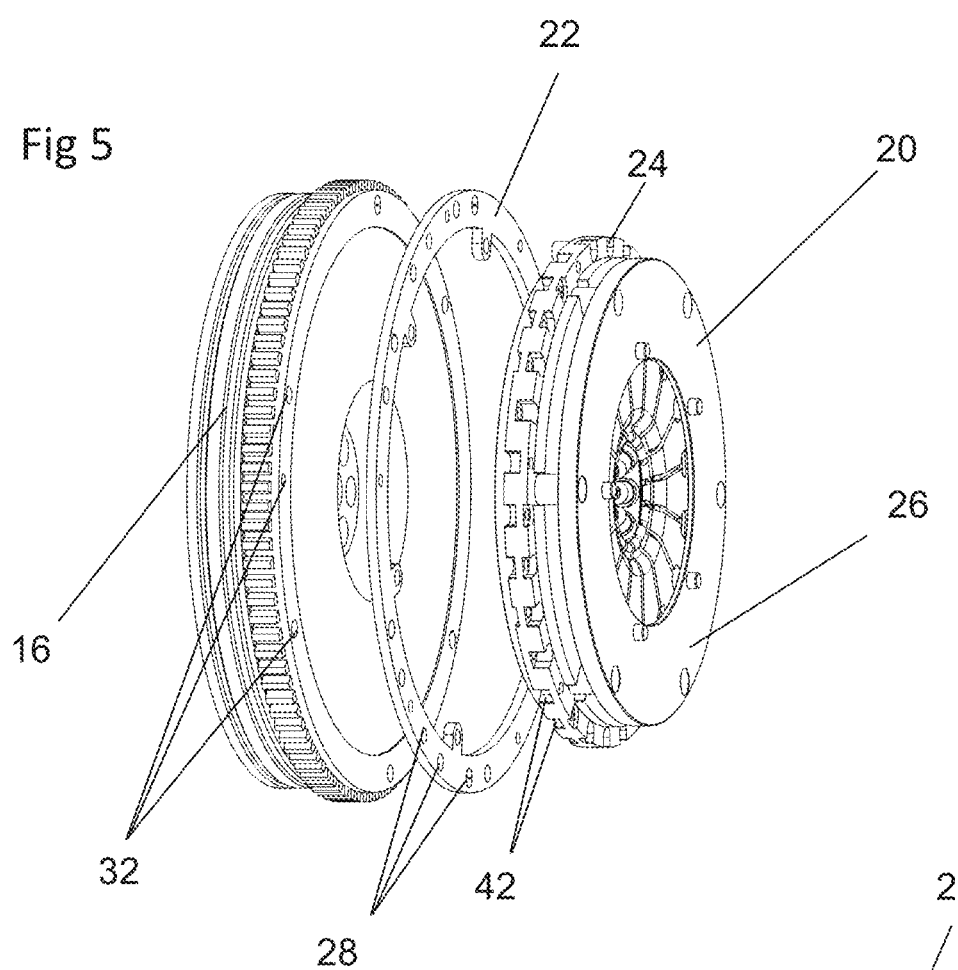
FIG. 5 is an exploded view like the FIG. 3 arrangement but showing an alternative fly wheel.

FIGS. 3 and 5 show exploded views of a flywheel and clutch assembly in which FIG. 3 shows the flywheel 14 and the clutch assembly 20 of FIG. 2, while FIG. 5 shows the clutch assembly 20 with a different flywheel 16 which is a heavier weight flywheel compared to the flywheel 14 of the clutch assembly 20 of FIG. 3 (it has greater thickness as shown and thus increased mass).

Figure 4:
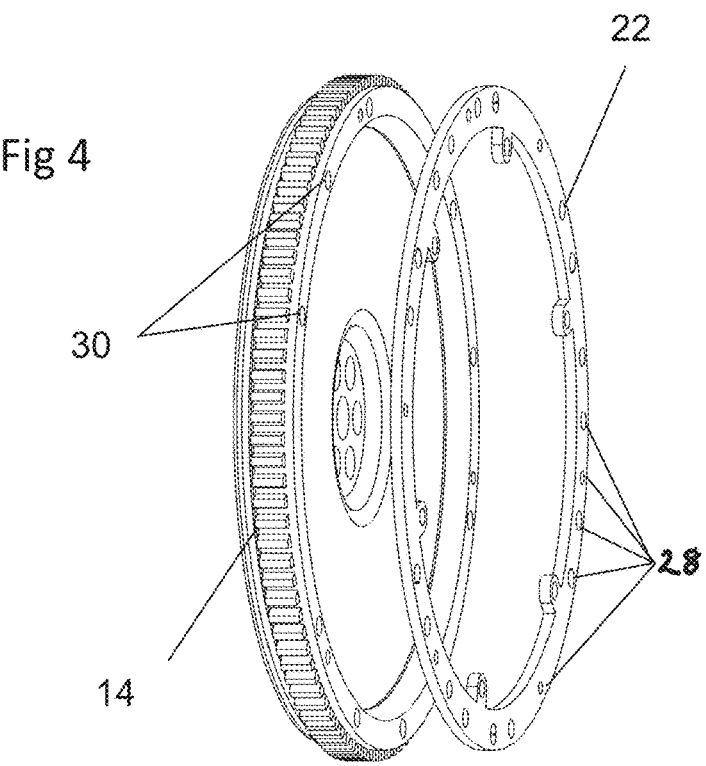
FIG. 4 is an exploded of the FIG. 3 arrangement with the clutch and spacer omitted.
Figure 6:
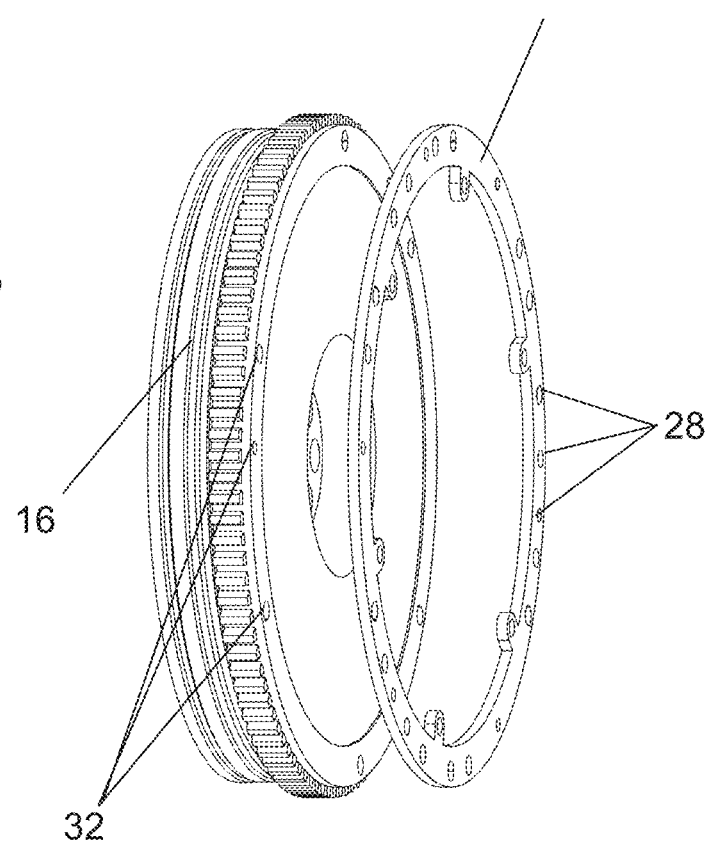
FIG. 6 is an exploded view of the FIG. 5 arrangement with the clutch and spacer omitted.

FIGS. 4 and 6 are versions of FIGS. 3 and 5 but which omit the clutch and spacer of those figures so as to show the full circumference of the adapter plate 22.

FIGS. 3 and 5 show the spacer 24 in connection with the clutch 26, although it is to be understood that the spacer is a separate component to the clutch 26.

FIGS. 3 to 6 show that the adapter plate 22 is formed as a ring and from plate metal and includes a plurality of openings 28 through which fasteners, usually bolts or stubs, can extend for connection with openings 30 or 32 in the flywheels 14 or 16. There are a greater number of openings 28 in the adapter plate 22 compared to the number of openings 30 or 32 in the flywheels 14 or 16, so that the adapter plate 22 can fit to other forms of flywheel that have different connection patterns, such as different openings at different positions, or different numbers of openings.

The flywheel 16 of FIGS. 5 and 6 has openings 32 in different positions to the openings 30 of the flywheel 14. However, the adapter plate 22 of FIGS. 3 and 4 that connects to the flywheel 14 can also connect with the flywheel 16, because the openings 28 of the adapter plate 22 are formed in groups that allow the one adapter plate 22 to be connected to the connection pattern of more than one flywheel. Thus, the adapter plate 22 has openings that register with the openings 30 of the flywheel 14 (the "connection pattern" of the flywheel 14) as well as openings that register with the openings 32 of the flywheel 16. This means that when the adapter plate 22 is connected to the flywheel 14, the openings of the adapter plate 22 through which connectors (bolts or studs usually) extend are different to the openings of the adapter plate 22 through which connectors extend when the adapter plate 22 is connected to the flywheel 16. It follows, that only a portion of the openings of the adapter plate 22 are ever used to accommodate connectors when the adapter plate 22 connects to a flywheel.

Moreover, the adapter plate 22 is intended to include additional openings so that it can be connected to other flywheels (the flywheel 10 of FIG. 1 for example) so that, for example, the adapter plate 22 could connect to three, four, five, six or more forms of flywheel. In this arrangement, only a small number of the openings of the adapter plate 22 would be used in the connection between the adapter plate 22 and a particular flywheel. The limitation on the numbers of openings is largely due to the space available within the footprint of the adapter plate and the size of the holes and their required positioning.

FIG. 7 shows the adapter plate 22 in isolation and this figure clearly shows that the plate 22 is formed in a ring shape with an inner opening 34 defined by an inner edge 36. The outer edge 38 is also circular. FIG. 7 also shows the connection tabs 40 that extend radially inwardly from the inner edge 36. These tabs are positioned and shaped for engagement with connection recesses 42 (see FIGS. 3 and 5) formed in the spacer 24. Applicant's co-pending Australian Provisional patent application 2020902618 describes this manner of connection in which the connection between the adapter plate 22 and the spacer 24 facilitates axial spacing of the clutch 26 relative to the flywheel 14 or 16.

The connection tabs 40 can also be arranged for direct connection to a clutch, where the spacer 24 is not required to adjust the axial positioning of the clutch relative to the flywheel.

The connection tabs 40 can also be formed differently to connect with the clutch or spacer in any suitable manner. In the illustrated form, the connection tabs 40 have openings through which bolts can extend to secure the adapter plate 22 to the clutch or spacer.

FIGS. 8 and 9 show the adapter plate 22 in connection with the flywheel 14, but it could alternatively be in connection with the flywheel 16. The heads of bolts 44 are shown in FIGS. 8 and 9 as the manner of connecting the adapter plate 22 to the flywheel 14. It is readily seen that the adapter plate 22 connects to the flywheel 14 by only six bolts 44 so that many of the openings 28 of the adapter plate 22 are not used for connection of the adapter plate 22 to the flywheel 14. Different openings 28 would be employed for connecting the adapter plate 22 to the flywheel 16 given the different positions of the openings 30 and 32 in the respective flywheels 14 or 16. In the position shown in FIGS. 8 and 9, the adapter plate 22 is ready for connection to the spacer 24 and clutch 26. This sequence of connection is not important and it is possible for the adapter plate 22 to be connected to the clutch or spacer first and then for the connection to be made to the flywheel.

Figure 10:
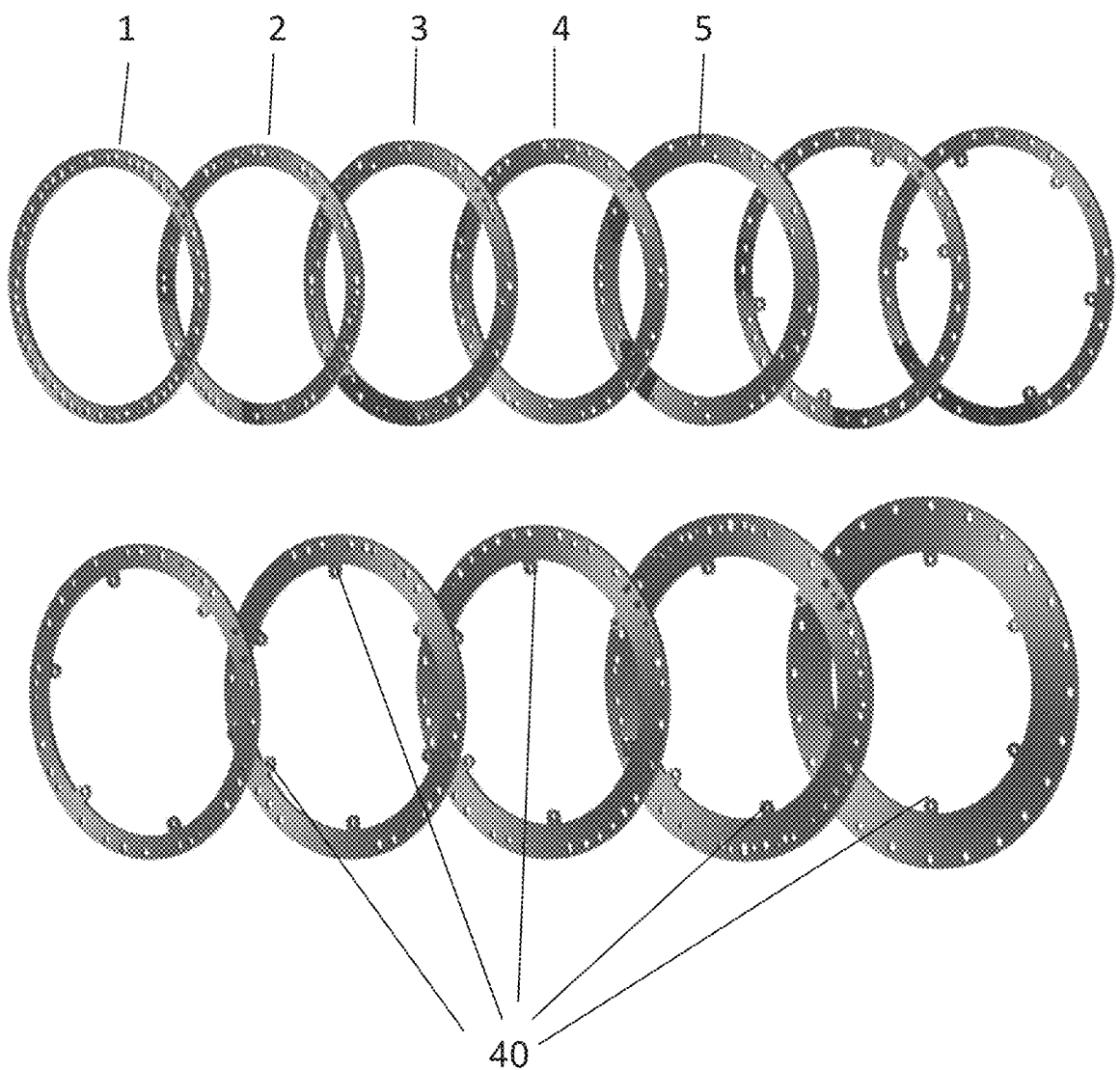
FIG. 10 shows a group of adapter plates according to the invention.

FIG. 10 shows 12 different versions of adapter plates that vary in size. Each of the adapter plates of FIG. 10 has the same diameter inner opening of approximately 253 mm for receipt of the same size of spacer 24 and/or clutch 26. This is beneficial in that the invention is intended to utilise only a small number of different clutches and the clutches generally will vary in depth from front to back and not in circumferential diameter. The depth variation will typically be as a result of the clutch being either a twin disc clutch or a triple or quad disc clutch. This means that where the adapter plates vary is in the width of the plates between the inner and outer edges and in the pattern of openings formed through them. The minimum width between the inner and outer edges is expected to be in the order of about 15 mm while the maximum width is expected to be in the order of about 100 mm.

Each adapter plate is intended to be fitted to different flywheels so that only one adapter plate of the 12 adapter plates will fit a particular flywheel. Of course it is intended that each adapter plate will fit at least two, but preferably more flywheels, but that one flywheel will not fit more than one adapter plate. It may be that some of the adapter plates will fit to more flywheels than others and so it is not required that each adapter plate fit the same number of flywheels.

The first five of the adapter plates shown and numbered in FIG. 10 do not include connection tabs 40. As indicated earlier herein, the use of the spacer 24 is dependent on the particular arrangement and not all clutch assemblies will require or benefit from the use of the spacer 24. In arrangements in which the spacer 24 is not used, the adapter plate can connect directly to the clutch and flywheel, or alternatively the adapter plate can connect to the sealed clutch by a plurality of individual elements or blocks that, like the spacer 24 provide height adjustment, but unlike the spacer 24, do not require the connection tabs 40. The remaining, un-numbered adapter plates include connection tabs, only several of which are marked 40, for connection to a spacer, like the ring spacer 24.

The adapter plate 22 of the earlier figures is formed of plate steel although it could be formed of different metals and while it is shown as a ring, it could be shaped differently as required. The inner edge of the adapter plate 22 could be other than circular as could the outer edge. Likewise, connection of the adapter plate 22 to the spacer 24 or the clutch 26 could be other than by the tabs 40.

The invention as shown in the figures can be supplied as a clutch assembly that has a single adapter plate, or it can be supplied with multiple adapter plates. The supply with multiple adapter plates is a business model that the Applicant expects the automotive repair market to find very appealing. It is envisaged for example, that a customer (a reseller/distributor and/or installer) would stock a range of adapter plates and replace them as they are used, noting that if 12 adapter plates are supplied with a single clutch assembly, only one of the adapter plates is used with the installation of the clutch assembly. One system conceived by the Applicant could involve supplying a customer with the full range of adapter plates with the first clutch assembly order and once the clutch assembly has been installed using just one of the 12 adapter plates that is suitable for the particular flywheel of the vehicle, the used adapter plate is replaced in the next clutch assembly order. By this system, the customer always has most of the adapter plates available to use.

The invention thus not only resides in the actual clutch assembly, but also in a system for mounting a clutch to a flywheel and to methods of installing a clutch assembly. These aspects of the invention all rely on the use of adapter plates that have at least two groups of openings for registration with the connection patterns of at least two different flywheels.

The important aspect of the present invention is the provision an adapter that has multiple sets of openings for registration with the connection patterns of at least two different flywheels and for the provision of sets of adapters with multiple sets of openings so that significant numbers of flywheels can be accommodated by a relatively small number of adapters.

Where any or all of the terms "comprise", "comprises", "comprised" or "comprising" are used in this specification (including the claims) they are to be interpreted as specifying the presence of the stated features, integers, steps or components, but not precluding the presence of one or more other features, integers, steps or components.

Those skilled in the art will appreciate that the invention described herein is susceptible to variations and modifications other than those specifically described. It is understood that the invention includes all such variations and modifications which fall within the spirit and scope of the present invention.

The invention claimed is:

1. A clutch assembly, comprising a sealed clutch and an adapter, the clutch being connected to the adapter and the adapter being connectable to at least two different flywheels by the adapter including openings positioned for registration with the connection pattern of the at least two different flywheels, the openings of the adapter comprising at least two groups of openings, a first group of openings for registration with the connection pattern of a first of the at least two different flywheels, and a second group of openings for registration with the connection pattern of a second of the at least two different flywheels, where the first and second different flywheels have different connection patterns from each other, the adapter being operable to connect the sealed clutch to the first or second flywheels of the at least two different flywheels so that the sealed clutch is not in direct connection with the first or second flywheels to which the adapter is connected, the adapter being formed as a ring having a circular inner opening defined by an inner edge the ring having a constant thickness and circular inner and outer edges with the dimension between the inner and outer edges being constant, and the adapter including connection tabs for connection to the sealed clutch, the connection tabs extending radially inwardly from the inner edge of the inner opening and having respective bolt openings for bolting the adapter to the sealed clutch.

2. The clutch assembly according to claim 1, the at least two groups of openings of the adapter comprising three, four, five, six or more groups of openings for registration with the connection patterns of, respectfully, three, four, five or six or more different flywheels of the at least two different flywheels, where the different flywheels have different connection patterns from each other.

3. The clutch assembly according to claim 2, one or more of the groups of openings having a different number of openings to the number of openings in the others of the groups of openings.

4. The clutch assembly according to claim 1, the adapter being formed as a plate.

5. The clutch assembly according to claim 1, a spacer being interposed between the clutch and the adapter, the spacer being connected to the clutch and the adapter connecting the spacer to the flywheel.

6. The clutch assembly according to claim 5, the spacer being formed as a ring having opposite axial facing leading and trailing surfaces, and the adapter being connectable to either of the leading or trailing surfaces of the spacer.

7. The clutch assembly according to claim 6, the spacer having an outside generally cylindrical surface and the adapter having a circular inner opening of slightly greater diameter than the outer surface of the spacer and the spacer is received within the opening when the adapter is connected to the spacer.

8. The clutch assembly according to claim 5, the spacer comprising a plurality of separate spacer elements that connect between the clutch and the adapter or between the adapter and the flywheel.

9. A method of installing a clutch assembly according to claim 1, to a selected flywheel of the at least two different flywheels, the method including connecting the adapter to the clutch and orienting the adapter so that the one of the at least two groups of openings is in register with the connection pattern of the selected flywheel, and connecting the adapter to the selected flywheel.

10. The method according to claim 9, the method including interposing a spacer between the clutch and the adapter.

11. A method of mounting a sealed clutch to at least four different flywheels, the method including a clutch kit comprising:

at least two adapters,
wherein each of the at least four different flywheels has different connection patterns from each other and each adapter of the at least two adapters includes openings positioned for registration with the connection pattern of at least two different flywheels of the at least four different flywheels, so that each adapter is connectable to at least two different flywheels of the at least four different flywheels, the openings of each adapter comprising at least two groups of openings with each group of the at least two groups of openings being positioned for registration with the different connection patterns of the at least two different flywheels of the at least four different flywheels, each adapter of the at least two adapters being formed as a ring having a circular inner opening defined by an inner edge the ring having a constant thickness and circular inner and outer edges with the dimension between the inner and outer edges being constant, and each adapter of the at least two adapters including connection tabs for connection to the sealed clutch, the connection tabs extending radially inwardly from the inner edge of the inner opening and having respective bolt openings for bolting the respective adapted to the sealed clutch, whereby, the method comprises selecting one of the adapters of the at least two adapters based on the connection pattern of the selected flywheel of the at least four different flywheels to which the sealed clutch is to be connected and connecting the sealed clutch to the selected adapter by connecting the sealed clutch to the connection tabs of the selected adapter, and connecting the adapter to the selected flywheel so that the sealed clutch is connected to the selected flywheel but is not in direct contact with the selected flywheel.

12. The method according to claim 11, the at least two groups of openings of the at least two adapters each comprising three, four, five, six or more groups of openings for registration with the connection patterns of, respectfully, three, four, five or six or more different flywheels of the at least four different flywheels, where the different flywheels have different connection patterns from each other.

13. The method according to claim 11, one or more of the groups of openings of the at least two groups of openings of each adapter of the at least two adapters having a different number of openings to the number of openings in the others of the at least two groups of openings.

14. The method according to claim 11, the inner edge of the each of the at least two adapter plates has generally the same diameter and the dimensions of the adapters differ by the radial distance between the inner and outer edges.

15. The method according to claim 11, including a spacer for interposing between the clutch and the adapter, whereby, the mounting system comprises connecting the spacer to the clutch and connecting the adapter to the flywheel.

\* \* \* \* \*